United States Patent [19]

Arai et al.

[11] Patent Number: 4,941,956
[45] Date of Patent: Jul. 17, 1990

[54] METHOD OF ENRICHING THE ISOTOPE CARBON 13 BY MEANS OF LASER IRRADIATION

[75] Inventors: Shigeyoshi Arai, Kyoto; Kyoko Sugita; Shohei Isomura, both of Tokyo; Hayato Kaetsu, Saitama, all of Japan

[73] Assignee: Rikagaku Kenkyusho, Saitama, Japan

[21] Appl. No.: 297,708

[22] Filed: Jan. 17, 1989

[30] Foreign Application Priority Data

Jan. 21, 1988 [JP] Japan ................................. 63-11555

[51] Int. Cl.$^5$ ............................................. B01D 59/34
[52] U.S. Cl. .............................. 204/157.2; 204/157.22
[58] Field of Search ........................ 204/157.22, 157.2

[56] References Cited

U.S. PATENT DOCUMENTS

| 4,212,717 | 7/1980 | Moore et al. | 204/157.22 |
| 4,313,807 | 2/1982 | de Mévergnies et al. | 204/157.2 |
| 4,406,763 | 4/1983 | Hsu et al. | 204/157.22 |
| 4,436,709 | 3/1984 | Gauthier et al. | 204/157.2 |

FOREIGN PATENT DOCUMENTS 1125230  6/1982  Canada ........................... 204/157.22
60-132629  7/1985  Japan .

OTHER PUBLICATIONS

Chemical Abstracts, vol. 101, 1984, p. 436.
Effects of $NH_3$ on $^{13}C$-Selective Infrared Multiple Photon Decomposition of $CF_2HCl$ by a $CO_2$ Laser, Bull. Chem. Soc. Jpn., 60 4217 4222 (1987).

Primary Examiner—Edward A. Miller
Assistant Examiner—Ngoclan T. Mai
Attorney, Agent, or Firm—Brumbaugh, Graves, Donohue & Raymond

[57] ABSTRACT

An enrichment method of carbon 13 by use of the multi-stage laser irradiation. A mixture of $CHClF_2$ and $Br_2$ is used as a start substance. The mixture is irradiated with laser rays emitted from a carbon dioxide gas laser to obtain $CBr_2F_2$ enriched with carbon 13. This $CBr_2F_2$ enriched with carbon 13 is once more irradiated with laser rays emitted from a carbon dioxide gas laser to produce $C_2Br_2F_4$ which is further enriched with carbon 13. Alternatively, the product $CBr_2F_2$ of the first laser irradiation is once more irradiated together with $O_2$ to produce $COF_2$ which is further enriched with carbon 13.

2 Claims, 1 Drawing Sheet

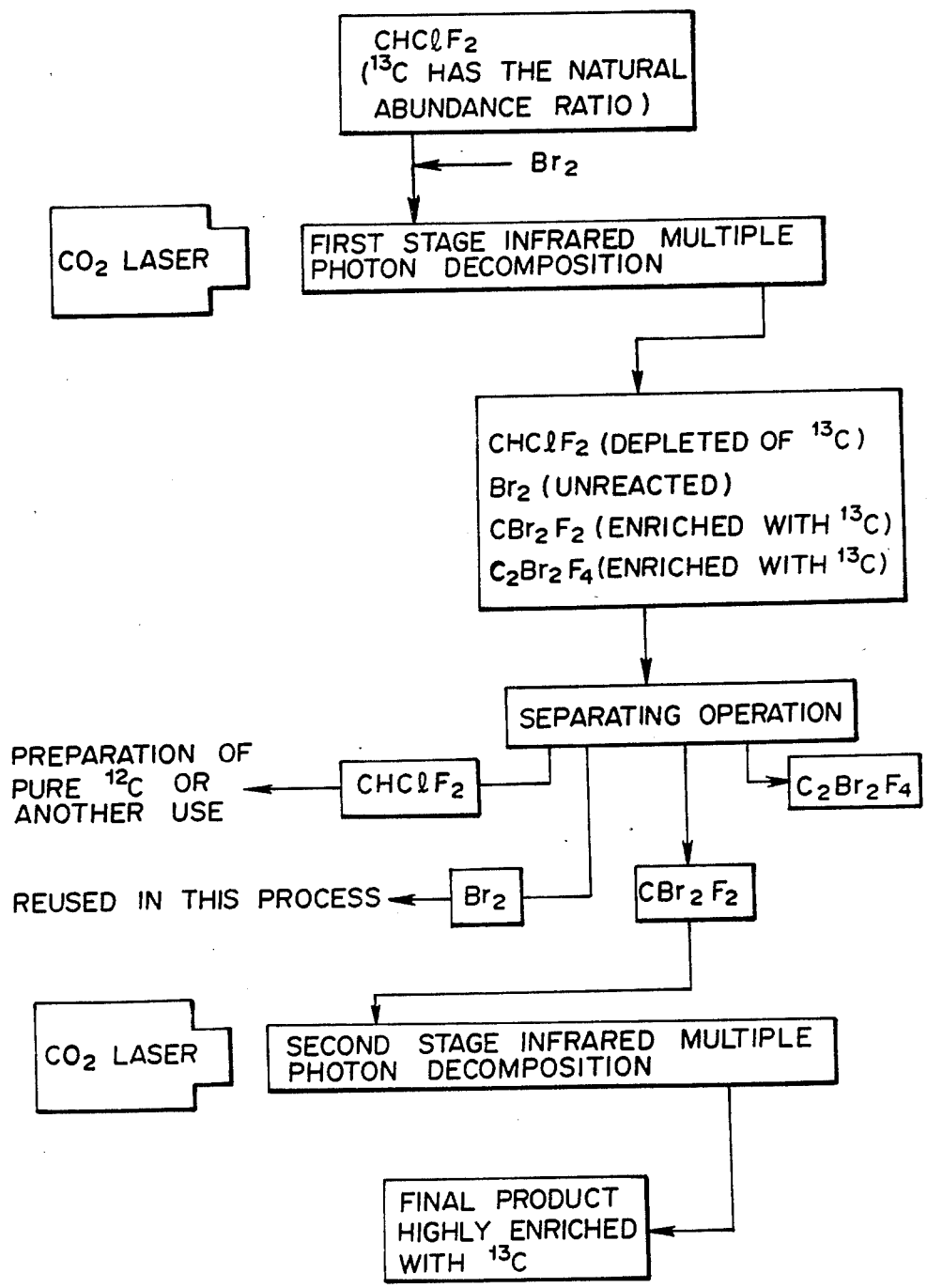

METHOD OF ENRICHING THE ISOTOPE CARBON 13 BY MEANS OF LASER IRRADIATION

BACKGROUND OF THE INVENTION

This invention relates to an enrichment method of carbon 13 by use of laser rays and particularly to an enrichment method of carbon 13 by means of laser isotope separation by way of infrared multiple-photon decomposition.

Natural carbon comprises isotopes of mass-numbers 12 and 13, ratios of which are 98.9% and 1.1%, respectively. Conventional enrichment methods of carbon 13 are based on low temperature distillation of CO, but these methods have such disadvantages that a large amount of poisonous gas should be used, large scale apparatus should be used and manufacturing cost is high. Therefore, it is very significant if carbon 13 is separated safely and cheaply by use of laser irradiation.

We will explain prior art enrichment methods of carbon 13 by the laser irradiation.

Working substance such as $CF_3X$ (wherein X is Cl, Br or I), or $CF_2HCl$ is irradiated with laser rays emitted from a $CO_2$ laser. In the infrared multiple photon decomposition of $CF_3X$, the final product is $C_2F_6$. In the infrared multiple photon decomposition of $CF_2HCl$, the final product is $C_2F_4$. The final products are enriched with Carbon 13.

In this method, so long as practically meaningfully high yield is intended, the ratio of carbon 13 after the enrichment is only 80% and does not reach to the ratio obtained in the conventional enrichment methods by way of the low temperature distillation of CO. In the method described in Japanese patent application public disclosue No. 60(1985)-132629, $C_2F_6$ is irradiated in presence of $Br_2$ with pulsed laser rays emitted from a $CO_2$ laser with adequate wavenumber and fluence. As a result of the photo-dissociation and the subsequent reaction, $CF_3Br$ is produced which is enriched with carbon 13 to a ratio of 20% to 30%. Next, the product $CF_3Br$ is separated and once more irradiated with pulsed laser rays emitted from a $CO_2$ laser under particular conditions to induce an infrared multiple photon decomposition. The product of the second infrared multiple photon decomposition is $C_2F_6$, in which the ratio of carbon 13 is increased to 90%.

SUMMARY OF THE INVENTION

Based on knowledge obtained from the above investigations, we invented a new enrichement method of carbon 13 by use of multistage laser irradiation. Namely, the laser irradiation is used plural times in order to gradually increase the concentration of carbon 13 because by use of only once laser irradiation the degree of enrichment does not exceed a limitation.

An object of this invention is to provide a method fulfilling the important requirements from the view point of practical use that the working substance easily causes the multiple photon decomposition, the working substance is largely and cheaply obtainable, the product of the first infrared multiple photon decomposition is directly usable in the second decomposition and the materials obtained during the decomposition process are reusable.

This invention relates to an enrichment method of carbon 13 by use of the multistage laser irradiation. This invention characterized in that a mixture of $CHClF_2$ and $Br_2$ is used as a start substance. The mixture is irradiated with laser rays emitted from a $CO_2$ laser to obtain $CBr_2F_2$ enriched with carbon 13. This $CBr_2F_2$ enriched with carbon 13 is once more irradiated with laser rays emitted from a $CO_2$ laser to produce $C_2Br_2F_4$ which is further enriched with carbon 13.

Alternatively, the product $CBr_2F_2$ of the first laser irradiation is once more irradiated together with $O_2$ to produce $COF_2$ which is further enriched with carbon 13.

FIG. 1 schematically shows the reaction process according to this invention.

When natural $CHClF_2$ is irradiated with pulsed laser emitted from $CO_2$ TEA laser, infrared multiple photon decomposition is caused to produce $CF_2$ and HCl. The laser rays are needed to be mildly focused by a lens in order to induce the decomposition. If the wavenumber of the laser rays is settled at about 1030 to 1050 cm$^{-1}$ and the fluence is settled below 10 Jcm$^{-2}$, the product $C_2F_4$ is enriched with $^{13}C$. This result is explained by the following reaction mechanism.

$$CHClF_2 + nh\nu \rightarrow CF_2 + HCl \quad (1)$$

$$CF_2 + CF_2 \rightarrow C_2F_4 \quad (2)$$

The reaction (1) represents the process that $CHClF_2$ absorbs a large number of photons and it causes decomposition. Under the above described irradiation conditions, molcules including $^{13}C$ are selectively decomposed and $CF_2$ radicals including a large amount of $^{13}C$ are generated. According to this coupling reaction of radicals (2), $C_2F_4$ enriched with $^{13}C$ is produced.

In the case that a large amount of $Br_2$ exsits in the reaction system, the following reaction will happen:

$$CF_2 + Br_2 \rightarrow CBrF_2 + Br \quad (3)$$

$$CF_2 + Br_2 \rightarrow CBr_2F_2 \quad (3')$$

$$CBrF_2 + Br_2 \rightarrow CBr_2F_2 + Br \quad (4)$$

$$CBrF_2 + CBrF_2 \rightarrow C_2Br_2F_4 \quad (5)$$

$$Br + Br \rightarrow Br_2 \quad (6)$$

The $CF_2$ radicals enriched with $^{13}C$ change to $CBrF_2$ radicals as the reaction (3) or to $CBr_2F_2$ as the reaction (3'), so that the reaction (2) is completely prevented. In consequence of the subsequent reactions (4) and (5), $CBr_2F_2$ and $C_2Br_2F_4$ are obtained as products. The relative ratio thereof varies depending upon the laser irradiation conditions and the added amount of $Br_2$. But the production amount of $CBr_2F_2$ is much greater than that of $C_2Br_2F_4$. The production $CBr_2F_2$ is highly enriched with $^{13}C$.

As a result of the $^{13}C$ selective infrared multiple photon decomposition of the mixture of natural $CHClF_2$ and $Br_2$, (a) $CHClF_2$ depleted of $^{13}C$, (b) $CBr_2F_2$ enriched with $^{13}C$, (c) $C_2Br_2F_4$ enriched with $^{13}C$, (d) HCl, and (e) unreacted $Br_2$ exist in the reaction system. In order to separate each composition, a low temperature distillation method can be adopted by virtue of those distinct boiling points ($CHClF_2$ is $-40.8°$ C., $CBr_2F_2$ is 24.5° C., $C_2Br_2F_4$ is 47.3° C., HCl is $-85°$ C., $Br_2$ is 58.8° C.). Alternatively, if the amount to be processed is small, the separation can be caused by a preparative type gaschromatograph having a column packed with silica gel.

As a result, $CHClF_2$, $CBr_2F_2$ and $C_2Br_2F_4$ are almost completely separated.

In the infrared absorption spectrum of natural $CBr_2F_2$, a strong absorption band is recognized at 1095 cm$^{-1}$. This is due to stretching vibration of $^{12}C$-F bond. The wave number of the absorption band due to stretching vibration of $^{13}C$-F bond is lower than that of $^{12}C$-F bond by 20 to 30 cm$^{-1}$, that is, 1065 to 1075 cm$^{-1}$. Therefore, in the infrared multiple photon decomposition of $CBr_2F_2$ there is a large isotope effect concerning carbon. When natural $CBr_2F_2$ of 5 Torr is irradiated with pulsed laser rays at a wave number of 9P(28), that is, 1039.37 cm$^{-1}$ and a fluence of 3 J cm$^{-2}$ generated by a $CO_2$ laser, $C_2Br_2F_4$ is produced as a main product according to the following reaction mechanism and the abundance ratio of $^{13}C$ reaches to 40%.

$$CBr_2F_2 + nh\nu \rightarrow CBrF_2 + Br \quad (8)$$

$$CBrF_2 + CBrF_2 \rightarrow C_2Br_2F_4 \quad (9)$$

$$Br + Br \rightarrow Br_2 \quad (10)$$

There is a great selectivity for $^{13}C$ in the photochemical decomposition process of the reaction (8).

Therefore, if the $CBr_2F_2$ products obtained by the first laser irradiation is further irradiated with laser rays emitted from a $CO_2$ laser, the second stage infrared multiple photon decomposition makes the final product highly enriched with $^{13}C$.

On the other hand, when $CBr_2F_2$ is irradiated together with $O_2$, the final product becomes $COF_2$ which is also enriched with $^{13}C$.

According to this invention, the enrichment of carbon 13 is quite easily accomplished by the multistage laser irradiation and carbon 13 can be obtained in high yield. Since the start working substance $CHClF_2$ is largely and cheaply manufactured and substances obtained during the reaction process are reusable, this invention brings a great advantage when it is industrially used.

$CO_2$ is adequate for the start substance for synthesising organic compounds labeled by $^{13}C$. In the case that the second stage infrared multiple photon decomposition is caused in the mixture of $CBr_2F_2$ and $O_2$ and then the product is treated with water, $CO_2$ enriched with $^{13}C$ is directly obtained.

The specific nature of this invention, as well as other objects, uses and advantages thereof, will be clear from the description and the accompanying drawing.

BRIEF DESCRIPTION OF THE DRAWING

FIG. 1 is a flowchart illustrating steps to obtain a final product enriched with $^{13}C$ according to this invention.

EXAMPLE $CO_2$ TEA laser was calibrated to oscilate and output laser rays at 9P(22) line of about 4J/pulse. The wavenumber of the laser rays was 1045.02 cm$^{-1}$. The laser rays were focused by a long focal lens and irradiated therewith the mixture of $CHClF_2$ of 50 Torr and $Br_2$ of 10 Torr which was enclosed in a reaction cell of about 3 m in length and 5 lit in volume with windows of NaCl at opposite ends. The number of irradiated pulses was restricted so that about 0.5% of $CHClF_2$ was decomposed. The product including carbon was mainly $CBr_2F_2$ and another product was a small amount of $C_2Br_2F_4$. The irradiated gas was taken into the preparative type gaschromatograph with a column of 17.5 mm in diameter and 3.5 m in lengh with a column packed with silca gel and $CBr_2F_2$ was separated. The results of mass spectrometry for the $CBr_2F_2$ are as follows:

TABLE I

Ion signal intensities of $CBrF_2^+$ ion fragment under the irradiation conditions that laser rays were focused a lens of 1.7 m in focal length and the fluence was 7 J cm$^{-2}$.

| m/e | Relative intensities of ion signals |
|---|---|
| 129 | 1.00 |
| 130 | 0.43 |
| 131 | 0.98 |
| 132 | 0.42 |
| $^{13}C/(^{12}C + ^{13}C) = 30\%$ | |

TABLE II

Ion signal intensities of $CBrF_2^+$ ion fragment under the irradiation conditions that the laser rays were focused by a lens of 3.0 m in focal length and the fluence 2.2 J cm$^{-2}$.

| m/e | Relative intensities of ion signals |
|---|---|
| 129 | 1.00 |
| 130 | 1.22 |
| 131 | 0.98 |
| 132 | 1.20 |
| $^{13}C/(^{12}C + ^{13}C) = 55\%$ | |

In the mass spectroscopic analysis of $CBr_2F_2$, ion signals of $CBrF_2^+$ are most strong. The isotope species thereof are $^{12}C^{79}Br^{19}F^{19}F^+$(m/e=129), $^{13}C^{79}Br^{19}F^{19}F^+$(m/e=130), $^{12}C^{81}Br^{19}F^{19}F^+$(m/e=131) and $^{13}C^{81}Br^{19}F^{19}F^+$(m/e=132). In the case that the laser rays were focused by a lens of 3 m in focal length, the ratio of $^{13}C$ in the $CBr_2F_2$ molecule was reached to 55%.

Next, $CBr_2F_2$ (the ratio of $^{13}C$ atoms was 30%), which was produced in the first stage infrared multiple photon decomposition and separated, was taken into a reaction cell and irradiated with pulsed laser rays at 9P(28) line, that is, 1039.37 cm$^{-1}$ emitted from a $CO_2$ laser apparatus. The fluence of the laser rays was 3.3 J cm$^{-2}$ and the the number of the irradiated pulses was 100. The pressure of $CBr_2F_2$ was about 10 Torr. The product was $C_2Br_2F_4$. The ratios of $^{12}C$ and $^{13}C$ atoms in the $C_2Br_2F_4$ molecules, which were measured by means of gas chromatography(GC) and massspectrometry(MS), were shown in Table III.

TABLE III

| Ion species | m/e | Relative intensities of ion signals |
|---|---|---|
| $^{12}CF^+$ | 31 | 0.05 |
| $^{13}CF^+$ | 32 | 1.00 |
| $^{13}C/(^{12}C + ^{13}C) = 95\%$ | | |

In the gas chromatography, Gaskuropack 55 with a column of 3 mm×6 m was used at 150° C. The ion, which was aimed during the measurement by the mass spectrometer, was $CF^+$. It was found that the ratio of $^{13}C$ was increased to 95%.

On the other hand, $O_2$ at 10 Torr was added to $CBr_2F_2$ (the ratio of $^{13}C$ atoms was 30%) at 10 Torr. The mixed gas was irradiated with 300 laser pulses under the same irradiation conditions that the wavenumber of the laser rays was 1039.37 cm$^{-1}$ and the fluence was 3.3 J cm$^{-2}$. In the case of $O_2$ existence, the product was $COF_2$. When $H_2O$ reacted with this product, it rapidly changed to $CO_2$. The ratios of $^{13}C$ and $^{12}C$ atoms in the $CO_2$ molecules, which were measured by GC and MS, were shown in Table IV.

TABLE IV

| Ion species | m/e | Relative intensities of ion signals |
| --- | --- | --- |
| $^{12}CO_2^+$ | 44 | 0.10 |
| $^{13}CO_2^+$ | 45 | 1.00 |
| $^{13}C/(^{12}C + ^{13}C) = 91\%$ | | |

From this result, it was found that the ratio of $^{13}C$ was increased to 91%.

What is claimed is:

1. A method of enriching the isotope carbon 13 by means of laser irradiation, comprising
   irradiating a mixture of $CHClF_2$ and $Br_2$ with laser rays emitted from a carbon dioxide gas laser to produce $CBr_2F_2$, and
   irradiating the produced $CBr_2F_2$ with laser rays emitted from a carbon dioxide gas laser.

2. A method of enriching the isotope carbon 13 by means of laser irradiation, comprising
   irradiating a mixture of $CHClF_2$ and $Br_2$ with laser rays emitted from a carbon dioxide gas laser to produce $CBr_2F_2$, and
   irradiating a mixture of the produced $CBr_2F_2$ and $O_2$ with laser rays emitted from a carbon dioxide gas laser.

* * * * *

UNITED STATES PATENT AND TRADEMARK OFFICE
CERTIFICATE OF CORRECTION

PATENT NO. : 4,941,956
DATED : July 17, 1990
INVENTOR(S) : Arai et al.

It is certified that error appears in the above-identified patent and that said Letters Patent is hereby corrected as shown below:

Title page, Item [56], right hand column, under "Chem. Soc. Jpn., 60 4217 4222 (1987).", insert --71-Nuclear Technology, Volumn 102, 1985, Page 449--.

Signed and Sealed this

Nineteenth Day of May, 1992

*Attest:*

DOUGLAS B. COMER

*Attesting Officer*     *Acting Commissioner of Patents and Trademarks*